US011199211B2

(12) United States Patent
Huang et al.

(10) Patent No.: US 11,199,211 B2
(45) Date of Patent: Dec. 14, 2021

(54) BRACKET POOL WITH A DETACHABLE STORAGE TRAY

(71) Applicant: BESTWAY INFLATABLES & MATERIAL CORP., Shanghai (CN)

(72) Inventors: Shuiyong Huang, Shanghai (CN); Xiaobo Chen, Shanghai (CN); Chun Yang, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 4 days.

(21) Appl. No.: 16/681,105

(22) Filed: Nov. 12, 2019

(65) Prior Publication Data

US 2020/0149570 A1    May 14, 2020

(30) Foreign Application Priority Data

Nov. 13, 2018    (CN) .......................... 201821860734.7

(51) Int. Cl.
*F16B 7/04* (2006.01)
*E04H 4/00* (2006.01)
*E04H 4/14* (2006.01)

(52) U.S. Cl.
CPC ......... *F16B 7/0486* (2013.01); *E04H 4/0056* (2013.01); *E04H 4/14* (2013.01)

(58) Field of Classification Search
CPC ....... F16B 7/0486; E06H 4/0056; E06H 4/14; E04H 4/0056; E04H 4/14
USPC ............................................................ 4/506
See application file for complete search history.

(56) References Cited

U.S. PATENT DOCUMENTS

| 6,474,244 | B1 * | 11/2002 | Karpinski ................. E04H 4/14 108/42 |
| 6,862,755 | B1 | 3/2005 | Crachy |
| 7,284,735 | B1 | 10/2007 | Khosropour et al. |
| 9,113,735 | B1 * | 8/2015 | Jansma ............... A47G 23/0208 |
| D776,797 | S * | 1/2017 | Bednarz ........................ D23/263 |
| D886,490 | S * | 6/2020 | Johnson ......................... D6/574 |
| 2004/0226486 | A1 | 11/2004 | Simpson |

(Continued)

FOREIGN PATENT DOCUMENTS

CN    200982089    11/2007

OTHER PUBLICATIONS

Extended European Search Report dated Apr. 1, 2020 (Apr. 1, 2020) issued by the European Patent Office on related European patent application 19207414.4.

(Continued)

*Primary Examiner* — Huyen D Le
(74) *Attorney, Agent, or Firm* — Dickinson Wright PLLC

(57) ABSTRACT

A joint assembly for a bracket pool. The joint assembly includes at least one receiving channel for receiving a supporting tube of the bracket pool. The joint assembly also includes an installation portion defining at least one coupling region. A detachable storage tray including a containing portion for storing objects and at least one connector is removably coupled to the at least one coupling region of the installation portion for removably connecting the detachable storage tray the installation portion. The detachable storage tray is very convenient to install and disassemble, very stable in use, does not occupy extra space, and has low economic costs and manufacturing time and costs.

22 Claims, 4 Drawing Sheets

(56) References Cited

U.S. PATENT DOCUMENTS

2016/0201348 A1* 7/2016 Liu .................. E04H 4/0056 4/506
2017/0356206 A1* 12/2017 Huang .............. E04H 4/0056
2018/0249838 A1   9/2018 Melaragno

OTHER PUBLICATIONS

Communication pursuant to Article 94(3) EPC (Examination Report) dated May 26, 2021 (May 26, 2021) issued on related European patent application 19207414.4 by the European Patent Office.

* cited by examiner

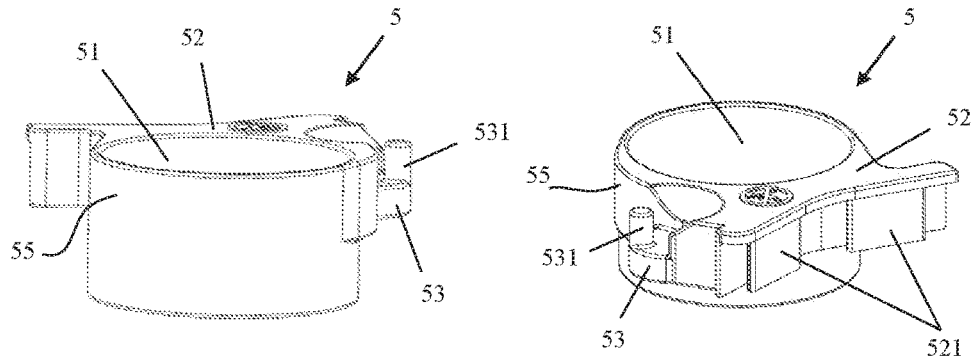
Fig.2  Fig.3
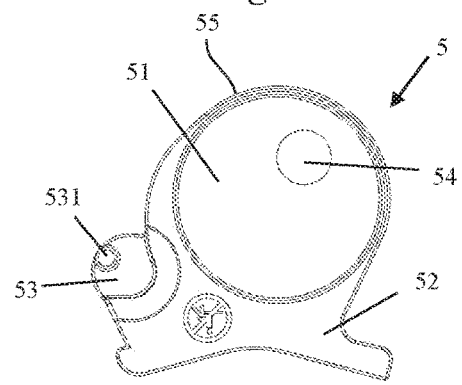 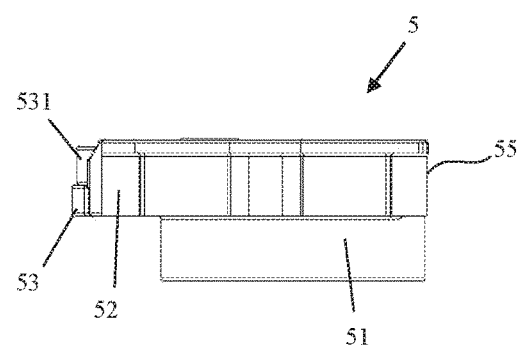
Fig.4  Fig.5
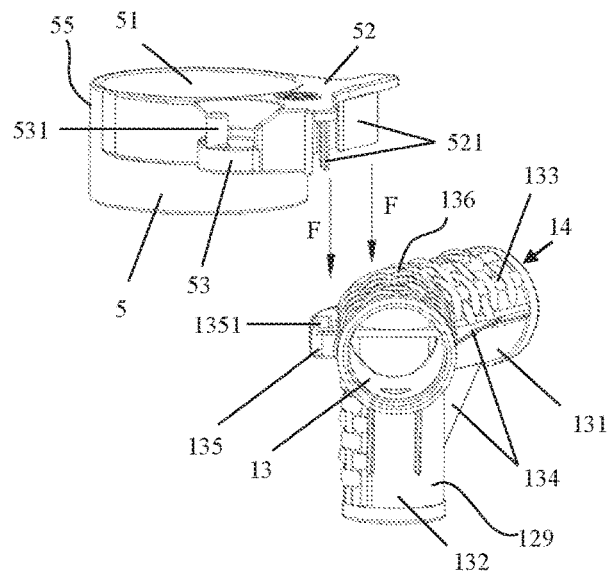 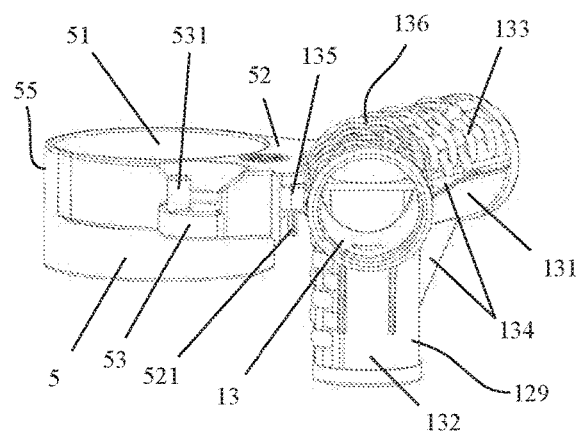
Fig.6  Fig.7

BRACKET POOL WITH A DETACHABLE STORAGE TRAY

CROSS REFERENCE TO RELATED APPLICATION

This application claims priority to Chinese Application Serial Number CN 201821860734.7, filed on Nov. 13, 2018, the entire disclosure of which is incorporated herein by reference.

RELATED FIELD

The present invention generally relates to above-ground pools. More particularly, the present disclosure relates to a bracket pool having a joint assembly with a detachable storage tray.

BACKGROUND

The above-ground pool is a recreational product used in outdoor open spaces such as home courtyards and gardens. Above ground pools are popular at least partially because they are easily installable in a variety of locations and relatively inexpensive.

Presently, there are primarily two types of above-ground pools: bracket pools and inflatable pools. Although there are various types of bracket pools, the circular bracket pool is the most typical, which mainly comprises a series of horizontal side tubes, vertical supporting tubes (the direction of which is substantially vertical) and a pool body. The horizontal side tubes are successively connected by a connecting member to form a circular structure. The vertical supporting tubes support the circular structure to form a supporting frame, and the pool body is fixed on the supporting frame for containing water.

During use of above-ground pools, users often need to place personal objects, such as cups, food, towels, mobile phones, keys, etc., in close proximity to the pool such that the objects are readily accessible. Typically, storage spaces that are separate from the pool are utilized for storing such objects. Such storage spaces can be inconveniently located and thus render the objects not readily available. Although it is known to fix certain storage devices to the pool body, an additional fixing member is required to secure such storage devices, which complicates the structure of the storage devices and the pool body, and often provides a poor fixing arrangement. Furthermore, installation and disassembly of such storage devices can be tedious and complicated, and the manufacturing of same can be expensive and time consuming.

SUMMARY

In order to overcome the above-mentioned drawbacks in the prior art, an object of the present disclosure is to provide a joint assembly for a bracket pool with a detachable storage tray. The detachable storage tray is very convenient to install and disassemble, very stable in use, occupies little space, and can be quickly and inexpensively manufactured.

To this end, according to a first aspect of the present disclosure, a joint assembly for a bracket pool is provided. The joint assembly includes at least one receiving channel for receiving a supporting tube of the bracket pool. The joint assembly also includes an installation portion defining at least one coupling region. A detachable storage tray including a containing portion for storing objects and at least one connector is removably coupled to the at least one coupling region of the installation portion for removably connecting the detachable storage tray to the installation portion.

According to another aspect of the present disclosure, the coupling region of the installation portion includes at least one insertion hole, and the at least one connector of the detachable storage tray includes at least one pin removably inserted into the at least one insertion hole of the installation portion for removably connecting the detachable storage tray to the installation portion.

According to another aspect of the disclosure, the at least one insertion hole comprises a pair of insertion holes, the at least one pin comprises a pair of pins, and the pair of pins are removably inserted into the pair of insertion holes.

According to another aspect of the disclosure, the containing portion of the detachable storage tray comprises a cup holder having a circular shaped cross-section.

According to another aspect of the disclosure, the containing portion of the detachable storage tray comprises a cup holder having a circular shaped cross-section and a plate extending outwardly from the cup holder.

According to another aspect of the disclosure the cup holder has a first depth in a vertical direction, the plate has a second depth in the vertical direction, and the first depth of the cup holder is greater than the second depth of the plate.

According to another aspect of the disclosure, the detachable storage tray further includes an installation flange presenting the at least one connector, the containing portion has a wall, and a hanging portion extends from at least one of the installation flange and the wall.

According to another aspect of the disclosure, the hanging portion comprises a post extending upwardly from the installation flange.

According to another aspect of the disclosure, the wall of the containing portion defines a pair of recesses, and the hanging portion includes a tab defined by the wall and located between the pair of recesses.

According to another aspect of the disclosure, the containing portion has a bottom surface defining an opening.

According to a second aspect of the disclosure, a bracket pool comprising a pool body and a pool bracket for supporting the pool body is provided. The pool bracket includes a plurality of horizontal supporting tubes coupled successively in a circumferential direction to form an annular structure. A plurality of vertical supporting tubes are fixed on the ground by a base and distributed in the circumferential direction to support the annular structure. A plurality of joint assemblies for coupling adjacent horizontal supporting tubes and for coupling each vertical supporting tube are located between the adjacent horizontal supporting tubes. Each joint assembly of the plurality of joint assemblies includes at least two receiving channels for receiving at least one of the horizontal supporting tubes and at least one of the vertical supporting tubes, an installation portion defining at least one coupling region, and a detachable storage tray including a containing portion for storing objects and at least one connector removably coupled to the at least one coupling region of the installation portion for removably connecting the detachable storage tray to the installation portion.

According to another aspect of the disclosure, the coupling region of the installation portion includes at least one insertion hole, and the at least one connector of the detachable storage tray includes at least one pin removably inserted into the at least one insertion hole of the installation portion for removably connecting the detachable storage tray to the installation portion.

According to another aspect of the disclosure, the at least one insertion hole comprises a pair of insertion holes, the at least one pin comprises a pair of pins, and the pair of pins are removably inserted into the pair of insertion holes.

According to another aspect of the disclosure, the containing portion of the detachable storage tray comprises a cup holder having a circular shaped cross-section.

According to another aspect of the disclosure, the containing portion of the detachable storage tray comprises a cup holder having a circular shaped cross-section and a plate extending outwardly from the cup holder.

According to another aspect of the disclosure, the cup holder has a first depth in a vertical direction, the plate has a second depth in the vertical direction, and the first depth of the cup holder is greater than the second depth of the plate.

According to another aspect of the disclosure, the detachable storage tray further includes an installation flange presenting the at least one connector, the containing portion has a wall, and a hanging portion extends from at least one of the installation flange and the wall.

According to another aspect of the disclosure, the hanging portion comprises a post extending upwardly from the installation flange.

According to another aspect of the disclosure, the wall of the containing portion defines a pair of recesses, and wherein the hanging portion includes a tab defined by the wall and located between the pair of recesses.

According to another aspect of the disclosure, the containing portion has a bottom surface defining an opening.

According to another aspect of the disclosure, each joint assembly of the plurality of joint assemblies comprises a joint housing defining the at least two receiving channels, and the joint housing is made of a plastic material.

According to another aspect of the disclosure, a reinforcing layer is provided on an outer surface of the joint housing.

According to another aspect of the disclosure, the reinforcing layer comprises a rattan structure.

According to another aspect of the disclosure, the reinforcing rib extends from the outer surface of the joint housing.

The bracket pool and joint assembly thereof according to the present disclosure have many advantages, in particular:

By coupling the connector, such as a pin, of the detachable storage tray with the coupling region, such as an insertion hole, of the installation portion, the detachable storage tray can be conveniently and reliably installed on the installation portion, and thus does not occupy extra space.

The detachable storage tray and other components of the joint assembly can be made of a plastic material, thus allowing the detachable storage tray and other components to be manufactured in a simple manner while using little material, thereby providing reduced manufacturing costs.

The joint assembly has a simple structure such that it can be widely used in various types of bracket pools and may be quickly and easily manufactured.

The detachable storage tray has high practicability, with the containing portion being suitable for storing water cups, food, mobile phones, wallets and other personal objects, and with the hanging portion being suitable for hanging keys, towels and other objects.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is an enlarged front perspective view of a detachable storage tray in the circle portion shown in FIG. 1;

FIG. 3 is a back perspective view of the detachable storage tray shown in FIG. 2;

FIG. 4 is a top view of the detachable storage tray shown in FIG. 2;

FIG. 5 is a side view of the detachable storage tray shown in FIG. 2;

FIG. 6 is an enlarged perspective view showing the detachable storage tray and a T-shaped joint of the bracket pool shown in FIG. 1, in which the detachable storage tray is to be installed on the T-shaped joint;

FIG. 7 is an enlarged perspective view showing the detachable storage tray and the T-shaped joint of the bracket pool shown in FIG. 1, in which the detachable storage tray has been installed on the T-shaped joint;

DESCRIPTION OF THE ENABLING EMBODIMENT

The implementation and use of the embodiments are discussed in detail below. However, it should be understood that the specific embodiments discussed only illustrate a specific way of implementing and using the present disclosure, rather than limiting the protection scope of the present disclosure.

It is noted that the drawings are not only used for the explanation and illustration of the present disclosure, but also for the limitation of the present disclosure if and when necessary.

In this specification, position terms such as "upward", "downward", "interior" and "exterior" are defined according to the normal use position of an above-ground pool.

Figure 1:
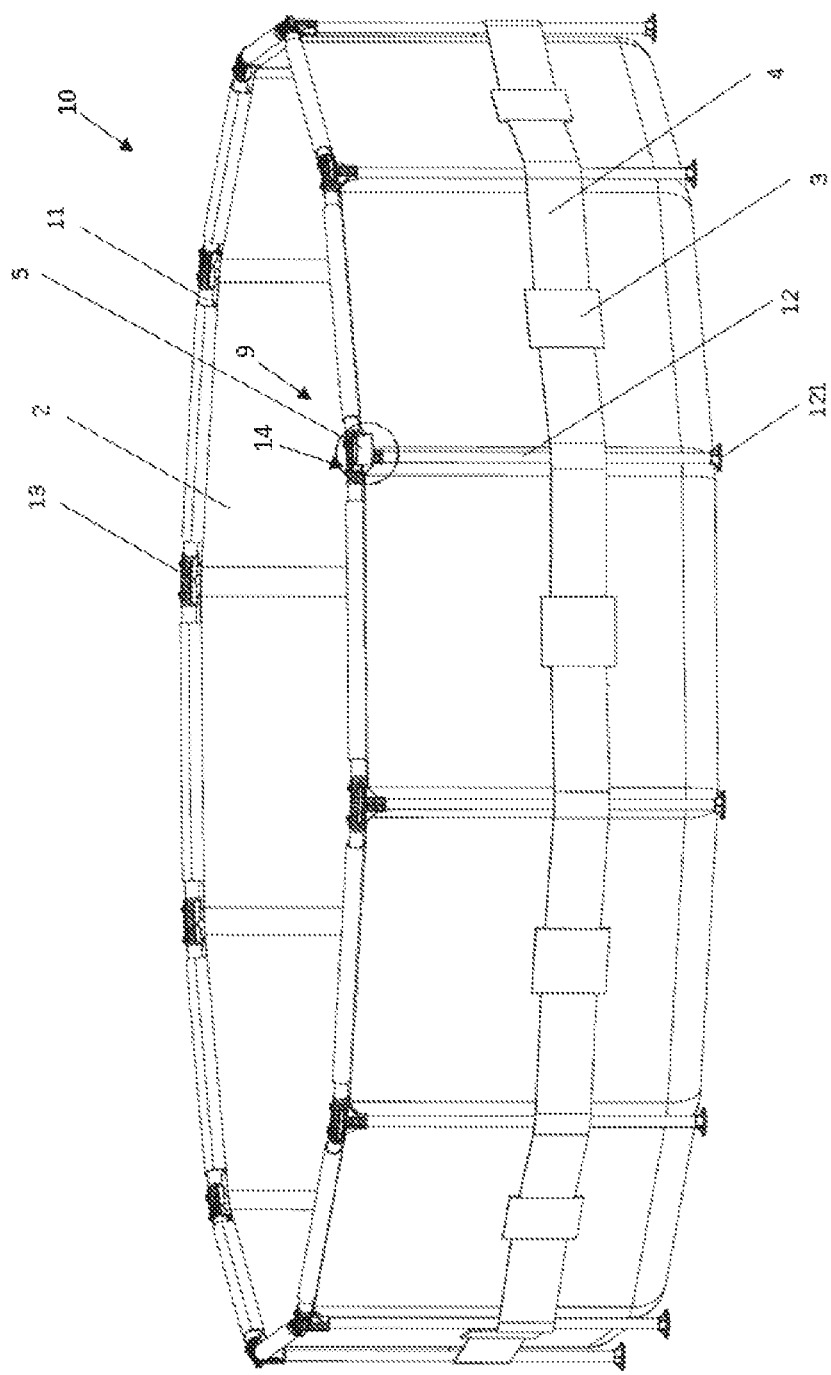
FIG. 1 is a perspective view of an embodiment of a bracket pool, according to the present disclosure.

Referring to the Figures, wherein like numerals indicate corresponding parts throughout the several views, a bracket pool 10 constructed in accordance with an embodiment of the present invention is generally shown in FIG. 1. The bracket pool 10 includes a pool body 2 and a pool bracket 9 for supporting the pool body 2. The pool bracket 9 includes a plurality of horizontal supporting tubes 11, a plurality of vertical supporting tubes 12 (which extend substantially in a vertical direction) and a plurality of joint assemblies 14. Each of the joint assemblies 14 includes a T-shaped joint 13. The horizontal supporting tubes 11 are successively connected in a circumferential direction to form an annular structure. The vertical supporting tubes 12 are fixed on the ground by a base 121 and distributed in the circumferential direction to support the annular structure. Each of the T-shaped joints 13 connects two adjacent horizontal supporting tubes 11 and one of the vertical supporting tube 12.

As shown in FIGS. 1, 6 and 7, each of the T-shaped joints 13 includes a joint housing 129 which defines a horizontal receiving channel 131 and a vertical receiving channel 132. The horizontal receiving channel 131 has a bending shape for receiving and connecting two adjacent horizontal supporting tubes 11 of the pool bracket 9. More specifically, the horizontal receiving channel 131 is bent at a middle region 136 thereof, and its bending angle is equal to an angle between two adjacent horizontal supporting tubes 11. The vertical receiving channel 132 extends downward in the vertical direction from an outer wall of the horizontal receiving channel 131 (preferably downward from the bent middle region 136 of the horizontal receiving channel 131) to receive a vertical supporting tube 12 located between two adjacent horizontal supporting tubes 11 of the pool bracket 9.

As further shown in FIG. 1, the bracket pool 10 also includes a tension supporting belt 4 and a plurality of tension supporting devices 3. The tension supporting devices 3 are fixed to an outer surface of the pool body 2 and are preferably spaced approximately the same distance from two adjacent vertical supporting tubes 12. The tension supporting belt 4 passes through the tension supporting devices 3, surrounds the outer surface of the pool body 2 and is positioned outside of each of the vertical supporting tubes 12, so as to keep each vertical supporting tube 12 in abutment against the pool body 2, thereby increasing the tension of the pool body 2. More preferably, the tension supporting belt 4 is located at a position that is approximately one third of a height of the outer surface of the pool body 2 in the vertical direction, which effectively reinforces the lower structure of the pool body 2 and makes it bear more pressure.

As shown in FIGS. 2 to 7, the joint assemblies 14 according to the present disclosure also include one or more detachable storage trays 5 which can be conveniently and removably installed on the T-shaped joints 13. The detachable storage trays 5 provide a convenient location for objects to be supported along an upper region of the bracket pool 10.

More particularly, as shown in FIGS. 2 to 7, each detachable storage tray 5 includes a containing portion 51 for storing objects, and an installation flange 52 extending outward from a sidewall 55 of the containing portion 51.

In the preferred embodiments shown in FIGS. 2 to 7, the containing portion 51 of the detachable storage tray 5 is a cup holder having a circular shaped cross-section with a diameter slightly greater than that of an ordinary water cup for receiving a water cup or an object of similar volume. The shape of the installation flange 52 of the detachable storage tray 5 matches the shape of an outside surface of the middle region 136 of the horizontal receiving channel 131 of the T-shaped joint 13.

In order to support the detachable storage tray 5, the T-shaped joint 13 includes an installation portion 135 extending from its outer surface away from the exterior of the bracket pool 10. The installation portion 135 is preferably positioned vertically at approximately the middle region 136 of the horizontal receiving channel 131 of the T-shaped joint 13 and covers the middle region 136 in the horizontal direction. The installation portion 135 is provided with at least one coupling region 1351 that is configured to be coupled with a connector 521 of the detachable storage tray 5. According to the preferred embodiments, the coupling region 1351 comprises at least one insertion hole 1351; the connector 521 comprises at least one pin 521; and the at least one pin 521 is configured to be inserted preferably in the vertical direction into the at least one insertion hole 1351. For example, in the illustrated preferred embodiment, there are two insertion holes 1351 with approximately rectangular cross-sections that are symmetrical to each other with respect to the middle region 136 of the horizontal receiving channel 131. The insertion holes 1351 preferably pass through a dimension of the installation portion 135 in the vertical direction. Furthermore, in the illustrated embodiment, there are two pins 521 with approximately rectangular cross sections. As shown in FIGS. 6 and 7, the pins 521 can be inserted vertically downward (as shown by an arrows F) into the corresponding insertion holes 1351 provided on the T-shaped joint 13 such that the detachable storage tray 5 can be conveniently and reliably installed on the T-shaped joint 13, without taking up additional space. After use, the detachable storage tray 5 can easily be removed. It should be appreciated that any other types of coupling regions and connectors could be utilized to removably connect the detachable storage tray 5 to the T-shaped joint 13.

Since the detachable storage tray 5 is installed on the outer side of the T-shaped joint 13 opposite the interior of the bracket pool, the edge of the installation flange 52 of the detachable storage tray 5 facing towards the T-shaped joint 13 preferably has a bending shape similar to that of the horizontal receiving channel 131 of the T-shaped joint 13.

According to the preferred embodiment of the present disclosure, the detachable storage tray 5 also includes a hanging portion 53 extending outward from the sidewall 55 of the containing portion 51 or from the edge of the installation flange 52. In the preferred embodiments shown in FIGS. 2 to 7, the hanging portion 53 extends outward from an edge of the installation flange 52. The hanging portion 53 includes an upward post 531 for hanging objects such as keys and towels.

FIGS. 8 to 15 show four variants of the detachable storage tray 5 according to the present disclosure. Compared with the detachable storage tray 5 shown in FIGS. 2 to 7, the detachable storage tray 5, according to the four variants shown in FIGS. 8 to 15, has a containing portion 51 with a larger volume and different shape in order to store more objects.

Figure 8:
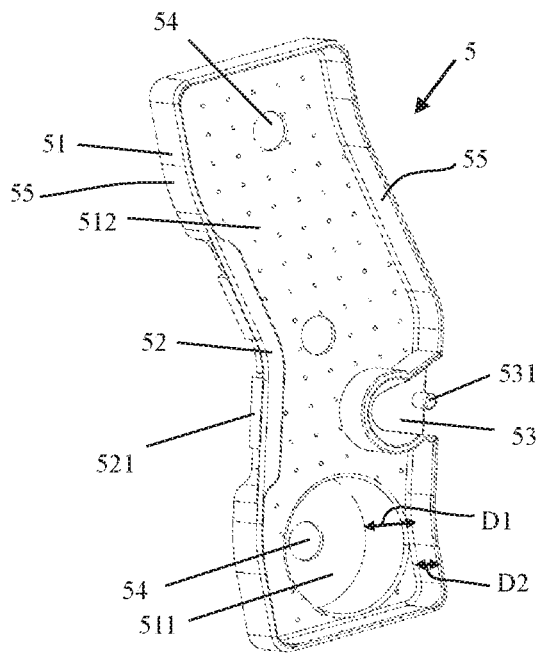
FIG. 8 is a left perspective view of a first variant of the detachable storage tray shown in FIG. 2.
Figure 9:
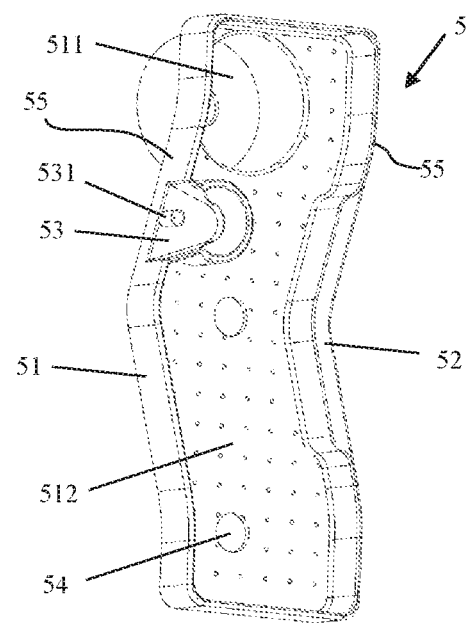
FIG. 9 is a right perspective view of the detachable storage tray shown in FIG. 8.

More particularly, in the first variant shown in FIGS. 8 and 9, the containing portion 51 has a cup holder 511 and a plate 512. The cup holder 511 has a substantially circular shaped cross-section, and the plate 512 has an approximately rectangular shaped cross-section, and its size in a length direction is about four times larger than that in a width direction. Two edges of the sidewall 55 of the containing portion 51 in the length direction have a bending shape and the installation flange 52 extends outward from a first of the two edges of the sidewall 55, while a concave portion is provided on a second of the edges of the sidewall 55 for setting the hanging portion 53. The installation flange 52 has a shape similar to that in the preferred embodiments shown in FIGS. 2 to 7 and includes two similar pins 521. The hanging portion 53 includes a post 531 for hanging objects.

The at least one circular cup holder 511 is located at one end of the containing portion 51 in the length direction, and the plate 512 extends outward from the edge of the cup holder 511. The cup holder 511 has a first depth D1 in the vertical direction from a top of the sidewall 55; the plate 512 has a second depth D2 in the vertical direction from a top of the sidewall 55; and the first depth D1 of the cup holder 511 is greater than the second depth D2 of the plate 512. Said another way, the cup holder 511 extends downwardly in the vertical direction to a greater extent than the plate 512. The diameter of the cup holder 511 is slightly greater than that of an ordinary water cup for placing a water cup or other objects with similar volume. The plate 512 can be used to store food, mobile phones, wallets and other objects.

Figure 10:
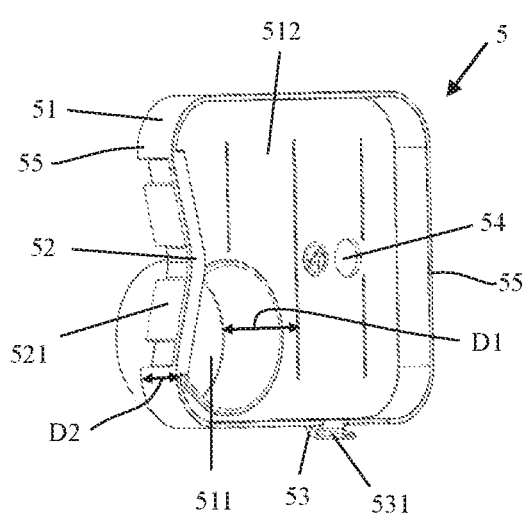
FIG. 10 is a left perspective view of a second variant of the detachable storage tray shown in FIG. 2.
Figure 11:
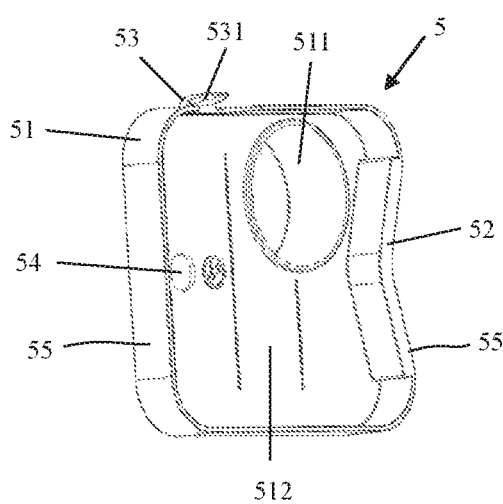
FIG. 11 is a right perspective view of the detachable storage tray shown in FIG. 10.

In the second variant shown in FIGS. 10 and 11, the containing portion 51 is also comprised of a cup holder 511 and a plate 512 that extends outwardly from the cup holder 511. The cup holder 511 has a substantially circular shaped cross-section. The plate 512 has an approximately square shape. A first edge of a sidewall 55 of the containing portion 51 has a bending shape, and the installation flange 52 extends outward from the first edge, while the hanging portion 53 extends outward from a second edge of the sidewall 55. The installation flange 52 has a shape similar to the preferred embodiments shown in FIGS. 2 to 7 and also includes two similar pins 521. The hanging portion 53 includes a post 531 for hanging objects.

The cup holder 511 is located at a corner of the containing portion 51. The plate 512 extends outward from an edge of the cup holder 511. Like the embodiment of FIGS. 8 and 9, the cup holder 511 has a first depth D1 in the vertical direction from a top of the sidewall 55; the plate 512 has a second depth D2 in the vertical direction from a top of the sidewall 55; and the first depth D1 of the cup holder 511 is greater than the second depth D2 of the plate 512. The diameter of the cup holder 511 is slightly greater than that of an ordinary water cup for placing a water cup or other objects with similar volume. The plate 512 can be used to store food, mobile phones, wallets and other objects.

Figure 12:
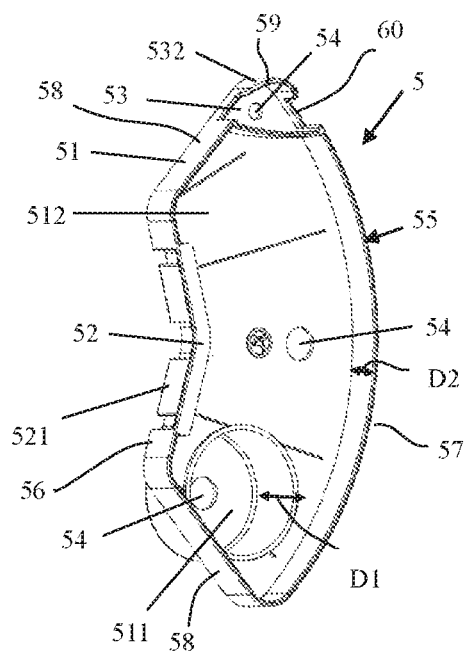
FIG. 12 is a left perspective view of a third variant of the detachable storage tray shown in FIG. 2.
Figure 13:
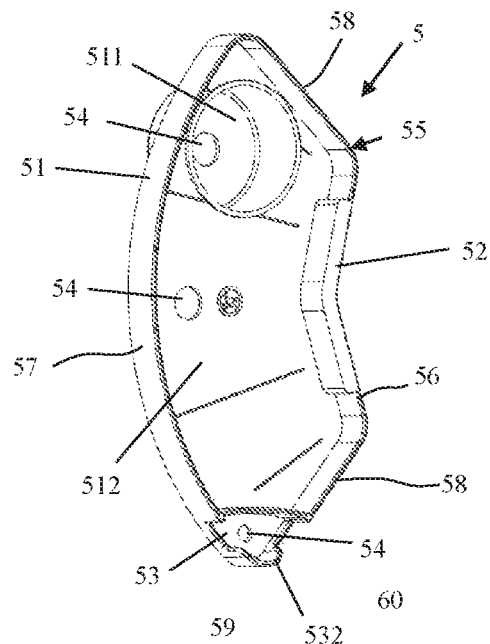
FIG. 13 is a right perspective view of the detachable storage tray shown in FIG. 12.

In the third variant shown in FIGS. 12 and 13, the containing portion 51 again is comprised of a cup holder 511 and a plate 512. The cup holder 511 has a substantially circular shaped cross-section. The plate 512 has an approximately sector shape, as shown. The installation flange 52 extends outward from an inner arc portion 56 of the sidewall 55 of the containing portion 51, while the hanging portion 53 extends from a transition region 59 between an outer arc region 57 and an outside region 58 of the sidewall 55 of the containing portion 51. The installation flange 52 has a shape similar to the preferred embodiments shown in FIGS. 2 to 7 and also includes two similar pins 521. The transition region 59 defines a pair of recesses 60, and the hanging portion 53 includes a tab 532 between the pair of recesses 60 for hanging objects.

The cup holder 511 is located at one end of the containing portion 51 in an arc length direction. The plate 512 extends outwardly from the edge of the cup holder 511. Like the embodiments of FIGS. 8-11, the cup holder 511 has a first depth D1 in the vertical direction from a top of the sidewall 55; the plate 512 has a second depth D2 in the vertical direction from a top of the sidewall 55; and the first depth D1 of the cup holder 511 is greater than the second depth D2 of the plate 512. The diameter of the cup holder 511 is slightly greater than that of an ordinary water cup for placing a water cup or other objects with similar volume. The plate 512 can be used to store food, mobile phones, wallets and other objects.

Figure 14:
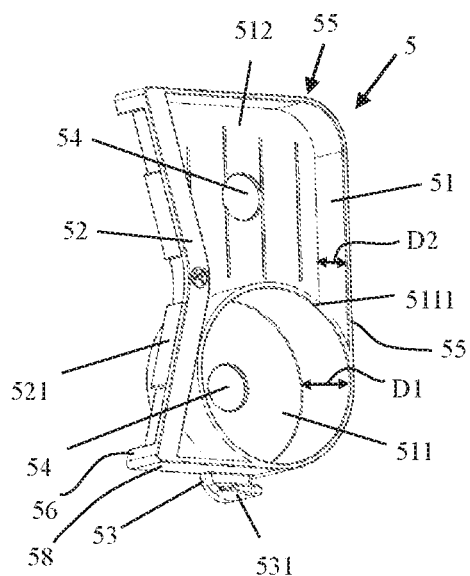
FIG. 14 is a left perspective view of a fourth variant of the detachable storage tray shown in FIG. 2.
Figure 15:
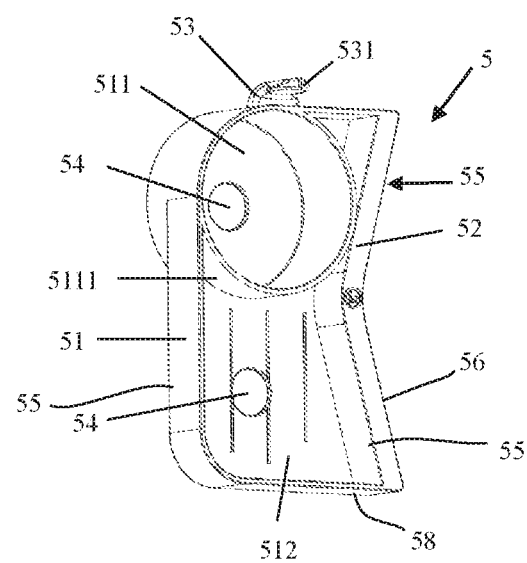
FIG. 15 is a right perspective view of the detachable storage tray shown in FIG. 14.

In the fourth variant shown in FIGS. 14 and 15, the containing portion 51 is again comprised of a cup holder 511 and a plate 512. The cup holder 511 has a circular shaped cross-section. The plate 512 has an approximately rectangular shape, and its size in the length direction is slightly greater than that in the width direction. An inner region 56 of a sidewall 55 of the containing portion 51 in the length direction has a bending shape and the installation flange 52 extends outward from the inner region 56, while the hanging portion 53 extends outwardly from an outside region 58 of the sidewall 55 in the width direction. The installation flange 52 has a shape similar to the preferred embodiments shown in FIGS. 2 to 7 and also includes two similar pins 521. The hanging portion 53 includes a post 531 for hanging objects.

The cup holder 511 is located at a corner of the containing portion 51, and the plate 512 extends outward from the edge of the cup holder 511. The cup holder 511 includes a cup holder wall 5111 that separates the cup holder 511 from the plate 512. Like the embodiments of FIGS. 8-13, the cup holder 511 has a first depth D1 in the vertical direction from a top of the sidewall 55; the plate 512 has a second depth D2 in the vertical direction from a top of the sidewall 55; and the first depth D1 of the cup holder 511 is greater than the second depth D2 of the plate 512. The diameter of the cup holder 511 is slightly greater than that of an ordinary water cup in order to place a water cup or other objects with similar volume. The plate 512 can be used to store food, mobile phones, wallets and other objects.

According to some preferred embodiments of the present disclosure, as shown in FIGS. 4 and 8 to 15, at least one opening 54 is provided at the bottom of the containing portion 51 so as to allow water entering the containing portion 51 to flow out through the at least one opening 54. In the first to fourth variants mentioned above, at least one opening 54 may be provided at the bottom of both the cup holder 511 and the plate 512. Of course, especially as shown in FIGS. 12 and 13, a similar opening 54 may also be provided at the bottom of the hanging portion 53 to play a similar role.

According to some preferred embodiments of the present disclosure, the detachable storage tray 5 can be made of plastic material, thus allowing the detachable storage tray 5 to be manufactured in a simple manner while using little material, thereby providing reduced manufacturing costs.

In addition, according to some preferred embodiments of the present disclosure, the joint housing 129 of the T-shaped joint 13 can also be made of plastic material, thus allowing the joint housing 129 to be manufactured in a simple manner while using little material, thereby providing reduced manufacturing costs. In this case, in order to ensure the strength of the T-shaped joint 13, a reinforcing layer can be provided on the outer surface of the joint housing 129. As shown in FIGS. 6 and 7, the reinforcing layer is, for example, a rattan structure 133, which not only ensures the connection strength of the T-shaped joint 13 and supports the detachable storage tray 5, but also enhances the appearance of the T-shaped joint 13. In addition, in order to further increase the strength of the T-shaped joint 13, as shown in FIGS. 6 and 7, at least one reinforcing rib 134 can be provided on the outer surface of the joint housing 129. For example, at least one reinforcing rib 134 is provided at the bending region of the outer surface of the horizontal receiving channel 131 and/or at the connecting region of the horizontal receiving channel 131 and the vertical receiving channel 132 of the joint housing 129.

Obviously, many modifications and variations of the present invention are possible in light of the above teachings and may be practiced otherwise than as specifically described while within the scope of the claimed invention. It is understood that all features described and of all embodiments can be combined with each other, so long as such combinations would not contradict one another.

What is claimed is:

1. A joint assembly for a bracket pool, comprising:
at least one receiving channel for receiving a supporting tube of the bracket pool;
an installation portion defining at least one coupling region, said at least one coupling region comprising at least one insertion hole; and
a detachable storage tray comprising a containing portion for storing objects and at least one connector comprising at least one pin removably inserted into said at least one insertion hole of said coupling region for removably connecting said detachable storage tray to said installation portion.

2. The joint assembly for a bracket pool according to claim 1, wherein said at least one insertion hole comprises a pair of insertion holes, wherein said at least one pin comprises a pair of pins, and wherein said pair of pins are removably inserted into said pair of insertion holes.

3. The joint assembly for a bracket pool according to claim 1, wherein said containing portion of said detachable storage tray comprises a cup holder having a circular shaped cross-section.

4. The joint assembly for a bracket pool according to claim 1, wherein said containing portion of said detachable storage tray comprises a cup holder having a circular shaped cross-section and a plate extending outwardly from said cup holder.

5. The joint assembly for a bracket pool according to claim 4, wherein said cup holder has a first depth in a vertical direction, wherein said plate has a second depth in said vertical direction, and wherein said first depth of said cup holder is greater than said second depth of said plate.

6. The joint assembly for a bracket pool according to claim 1, wherein said containing portion has a bottom surface defining an opening.

7. A joint assembly for a bracket pool, comprising:
at least one receiving channel for receiving a supporting tube of the bracket pool;
an installation portion defining at least one coupling region; and
a detachable storage tray comprising:
a containing portion for storing objects;
at least one connector removably coupled to said at least one coupling region of said installation portion for removably connecting said detachable storage tray to said installation portion, and
an installation flange;
wherein said containing portion has a wall, and wherein a hanging portion extends from at least one of said installation flange and said wall.

8. The joint assembly for a bracket pool according to claim 7, wherein said hanging portion comprises a post extending upwardly from said installation flange.

9. The joint assembly for a bracket pool according to claim 7, wherein said wall of said containing portion defines a pair of recesses, and wherein said hanging portion includes a tab defined by said wall and located between said pair of recesses.

10. A bracket pool, comprising a pool body and a pool bracket for supporting the pool body, wherein the pool bracket comprises:
a plurality of horizontal supporting tubes coupled successively in a circumferential direction to form an annular structure;
a plurality of vertical supporting tubes fixed on the ground by a base and distributed in the circumferential direction to support the annular structure; and
a plurality of joint assemblies for coupling adjacent horizontal supporting tubes and for coupling each vertical supporting tube located between the adjacent horizontal supporting tubes;
wherein each joint assembly of said plurality of joint assemblies comprises:
at least two receiving channels for receiving at least one of the horizontal supporting tubes and at least one of the vertical supporting tubes;
an installation portion defining at least one coupling region, said at least one coupling region comprising at least one insertion hole; and
a detachable storage tray comprising a containing portion for storing objects and at least one connector comprising at least one pin removable inserted into said at least one insertion hole of said coupling region for removably connecting said detachable storage tray to said installation portion.

11. The bracket pool according to wherein said at least one insertion hole comprises a pair of insertion holes, wherein said at least one pin comprises a pair of pins, and wherein said pair of pins are removably inserted into said pair of insertion holes.

12. The bracket pool according to claim 10, wherein said containing portion of said detachable storage tray comprises a cup holder having a circular shaped cross-section.

13. The bracket pool according to claim 10, wherein said containing portion of said detachable storage tray comprises a cup holder having a circular shaped cross-section and a plate extending outwardly from said cup holder.

14. The bracket pool according to claim 13, wherein said cup holder has a first depth in a vertical direction, wherein said plate has a second depth in said vertical direction, and wherein said first depth of said cup holder is greater than said second depth of said plate.

15. The bracket pool according to claim 10, wherein said containing portion has a bottom surface defining an opening.

16. The bracket pool according to claim 10, wherein each joint assembly of said plurality of joint assemblies comprises a joint housing defining said at least two receiving channels, and wherein said joint housing is made of a plastic material.

17. The bracket pool according to claim 16, further comprising a reinforcing layer provided on an outer surface of said joint housing.

18. The bracket pool according to claim 17, wherein said reinforcing layer comprises a rattan structure.

19. The bracket pool according to claim 17, further comprising a reinforcing rib extending from said outer surface of said joint housing.

20. A bracket pool, comprising a pool body and a pool bracket for supporting the pool body, wherein the pool bracket comprises:
a plurality of horizontal supporting tubes coupled successively in a circumferential direction to form an annular structure,
a plurality of vertical supporting tubes fixed on the ground by a base and distributed in the circumferential direction to support the annular structure; and
a plurality of joint assemblies for coupling adjacent horizontal supporting tubes for coupling each vertical supporting tube located between the adjacent horizontal supporting tubes;

wherein each joint assembly of said plurality of joint assemblies comprises:
  at least two receiving channels for receiving at least ne of the horizontal supporting tubes and at least one of the vertical supporting tubes;
  an installation portion defining at least one coupling region, and
  a detachable storage tray comprising:
    a containing portion for storing objects,
    at least one connector removably coupled to said at least one coupling region of said installation portion for removably connecting said detachable storage tray to said installation portion, and
    an installation flange, wherein said containing portion has a wall, and wherein a hanging portion extends from at least one of said installation flange and said wall.

21. The bracket pool according to claim 20, wherein said hanging portion comprises a post extending upwardly from said installation flange.

22. The bracket pool according to claim 20, wherein said wall of said containing portion defines a pair of recesses, and wherein said hanging portion includes a tab defined by said wall and located between said pair of recesses.

* * * * *